US010427087B2

(12) United States Patent
Willert

(10) Patent No.: US 10,427,087 B2
(45) Date of Patent: *Oct. 1, 2019

(54) DEHUMIDIFIER APPARATUS AND DISPOSABLE CARTRIDGE THEREFOR

(71) Applicant: Willert Home Products, Inc., Saint Louis, MO (US)

(72) Inventor: Bryan Bruce Willert, Saint Louis, MO (US)

(73) Assignee: Willert Home Products, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/919,859

(22) Filed: Mar. 13, 2018

(65) Prior Publication Data

US 2018/0200663 A1    Jul. 19, 2018

Related U.S. Application Data

(63) Continuation of application No. 15/195,846, filed on Jun. 28, 2016, now Pat. No. 9,943,798.

(51) Int. Cl.
*B01D 53/02* (2006.01)
*B01D 53/04* (2006.01)
(Continued)

(52) U.S. Cl.
CPC ....... *B01D 53/0415* (2013.01); *B01D 53/229* (2013.01); *B01D 53/261* (2013.01);
(Continued)

(58) Field of Classification Search
CPC .............. B01D 53/0415; B01D 53/229; B01D 53/261; B01D 2257/80; F24F 3/1411; F24F 2003/1446

See application file for complete search history.

(56) References Cited

U.S. PATENT DOCUMENTS 2,693,864 A    11/1954  Ferro
2,994,404 A *  8/1961  Schifferly ............ B01D 53/261
                                            206/0.5
(Continued)

FOREIGN PATENT DOCUMENTS

WO    03092863 A1    11/2003
WO    03092866 A1    11/2003

OTHER PUBLICATIONS

DampRid Refillable Moisture Absorbers, 2 pages, printed Jun. 24, 2016, http://www.damprid.com/product/refillable-moisture-absorbers-unscented.
(Continued)

*Primary Examiner* — Christopher P Jones
(74) *Attorney, Agent, or Firm* — Armstrong Teasdale LLP

(57) ABSTRACT

A dehumidifier apparatus is provided. The apparatus includes a housing having an interior space and a vent for permitting airflow into the interior space. The apparatus also includes a cartridge sized for removable insertion into the interior space of the housing. The cartridge includes a tray defining a first pocket, a second pocket, and a channel extending from the first pocket to the second pocket. The cartridge also includes a cover coupled to the tray over the first pocket such that the first pocket is in fluid communication with the second pocket via the channel. The cover has a first layer and a second layer detachable from the first layer. The first layer is gas permeable and liquid impermeable. The second layer is gas impermeable and liquid impermeable. The cartridge further includes a desiccant material contained in the first pocket by the cover.

20 Claims, 4 Drawing Sheets

(51) Int. Cl.
*B01D 53/22* (2006.01)
*B01D 53/26* (2006.01)
*F24F 3/14* (2006.01)

(52) U.S. Cl.
CPC ........ *F24F 3/1411* (2013.01); *B01D 2257/80* (2013.01); *B01D 2259/4508* (2013.01)

(56) References Cited

U.S. PATENT DOCUMENTS

| | | |
|---|---|---|
| 3,277,636 A | 10/1966 | Hemmerlein |
| 4,394,144 A | 7/1983 | Aoki |
| 4,927,436 A | 5/1990 | Glienke |
| 5,148,613 A | 9/1992 | Cullen |
| 5,907,908 A | 6/1999 | Cunanan et al. |
| 6,423,122 B1 | 7/2002 | Kelders |
| 6,767,521 B1 | 7/2004 | Vogt et al. |
| 6,899,749 B2 | 5/2005 | Johansson |
| 7,377,958 B2 | 5/2008 | Cunanan |
| 2005/0098450 A1 | 5/2005 | Liu |
| 2005/0217486 A1* | 10/2005 | Robinson ........... B01D 53/0415 96/118 |
| 2009/0031747 A1 | 2/2009 | Lazzarini et al. |

OTHER PUBLICATIONS

DampRid Fragrance Free Moisture Absorber Refill, 2 pages, printed Jun. 24, 2016, http://www.homedepot.com/p/DampRid-42-oz-Fragrance-Free-Moisture-Absorber-Refill-FG30K/100390413.

DampRid Any Room Easy-Fill Absorbing System, 2 pages, printed Jun. 24, 2016, http://www.bedbathandbeyond.com/store/product/damprid-any-room-easy-fill-absorbing-system/1016793590?skuld=16793590&mcid=PS_googlepla_nonbrand_kitchenaccessories_&adpos=1o2&creative=43742633029&device=c&matchtype=&network=g&product_id=16793590&gclid=CICR6sGdIs0CFQIOaQodLrANhA.

DampRid Flanging Moisture Absorber, 1 page, printed Jun. 24, 2016, http://www.damprid.com/product/hanging-moisture-absorberfresh-scent.

Airboss Anywhere Dehumidifier, 4 pages, printed Jun. 28, 2016, http://airboss-aircare.com/product/anywhere-dehumidifier/.

* cited by examiner

DEHUMIDIFIER APPARATUS AND DISPOSABLE CARTRIDGE THEREFOR

CROSS REFERENCE TO RELATED APPLICATIONS

This application is a continuation of U.S. patent application Ser. No. 15/195,846 filed Jun. 28, 2016, the disclosures of which are incorporated by reference herein in its entirety as part of the present application.

BACKGROUND OF THE DISCLOSURE

The subject matter described herein relates generally to a dehumidifier apparatus and, more particularly, to a dehumidifier apparatus and a disposable cartridge therefor.

Many known nonelectric dehumidifiers have a compartment containing a desiccant material that absorbs moisture from the air, and a trap situated beneath the compartment for collecting water discharged from the desiccant material when the desiccant material becomes supersaturated. However, with some such dehumidifiers, it can be difficult to deploy the dehumidifier, refill the desiccant material, monitor the water level in the trap, and/or empty water from the trap when the trap is full. Moreover, at least some known dehumidifiers of this type are prone to water spillage from the trap when the dehumidifier is dropped or otherwise tips over.

It would be useful, therefore, to provide a nonelectric dehumidifier apparatus that is easier to deploy, refill, monitor, and/or empty.

BRIEF DESCRIPTION OF THE DISCLOSURE

In one aspect, a dehumidifier apparatus is provided. The apparatus includes a housing having an interior space and a vent for permitting airflow into the interior space. The apparatus also includes a cartridge sized for removable insertion into the interior space of the housing. The cartridge includes a tray defining a first pocket, a second pocket, and a channel extending from the first pocket to the second pocket. The cartridge also includes a cover coupled to the tray over the first pocket such that the first pocket is in fluid communication with the second pocket via the channel. The cover has a first layer and a second layer detachable from the first layer. The first layer is gas permeable and liquid impermeable. The second layer is gas impermeable and liquid impermeable. The cartridge further includes a desiccant material contained in the first pocket by the cover.

In another aspect, a disposable cartridge for a dehumidifier apparatus is provided. The cartridge includes a tray defining a first pocket, a second pocket, and a channel extending from the first pocket to the second pocket. The cartridge also includes a cover coupled to the tray over the first pocket such that the first pocket is in fluid communication with the second pocket via the channel. The cover has a first layer and a second layer detachable from the first layer. The first layer is gas permeable and liquid impermeable. The second layer is gas impermeable and liquid impermeable. The cartridge further includes a desiccant material contained in the first pocket by the cover.

In another aspect, a method of making a disposable cartridge for a dehumidifier apparatus is provided. The method includes providing a tray defining a first pocket, a second pocket, and a channel extending from the first pocket to the second pocket. The method also includes inserting a desiccant material in the first pocket of the tray. The method further includes coupling a cover to the tray over the first pocket such that the first pocket is in fluid communication with the second pocket via the channel and such that the desiccant material is contained in the first pocket. The cover has a first layer and a second layer detachable from the first layer. The first layer is gas permeable and liquid impermeable. The second layer is gas impermeable and liquid impermeable.

DETAILED DESCRIPTION OF THE DISCLOSURE

The methods and systems described herein facilitate providing a dehumidifier apparatus that is easily deployed, monitored, and refilled/emptied. More specifically, the methods and systems described herein facilitate providing a dehumidifier apparatus that is easily deployed by removing part of a cover from a cartridge, inserting the cartridge into a housing, and positioning the housing in a location for which dehumidification is desired. The method and systems described herein also facilitate providing an apparatus that is easily monitored to determine whether the cartridge is in need of replacement, in that the cartridge uses the liquid removed from the air to create a colored gel that is visible to the user through a tray of the cartridge and a window of the housing. Moreover, the methods and systems described herein further facilitate providing an apparatus that is easily refilled/emptied by pulling the cartridge out of the housing for disposal, and inserting a new cartridge into the housing.

Figure 1:
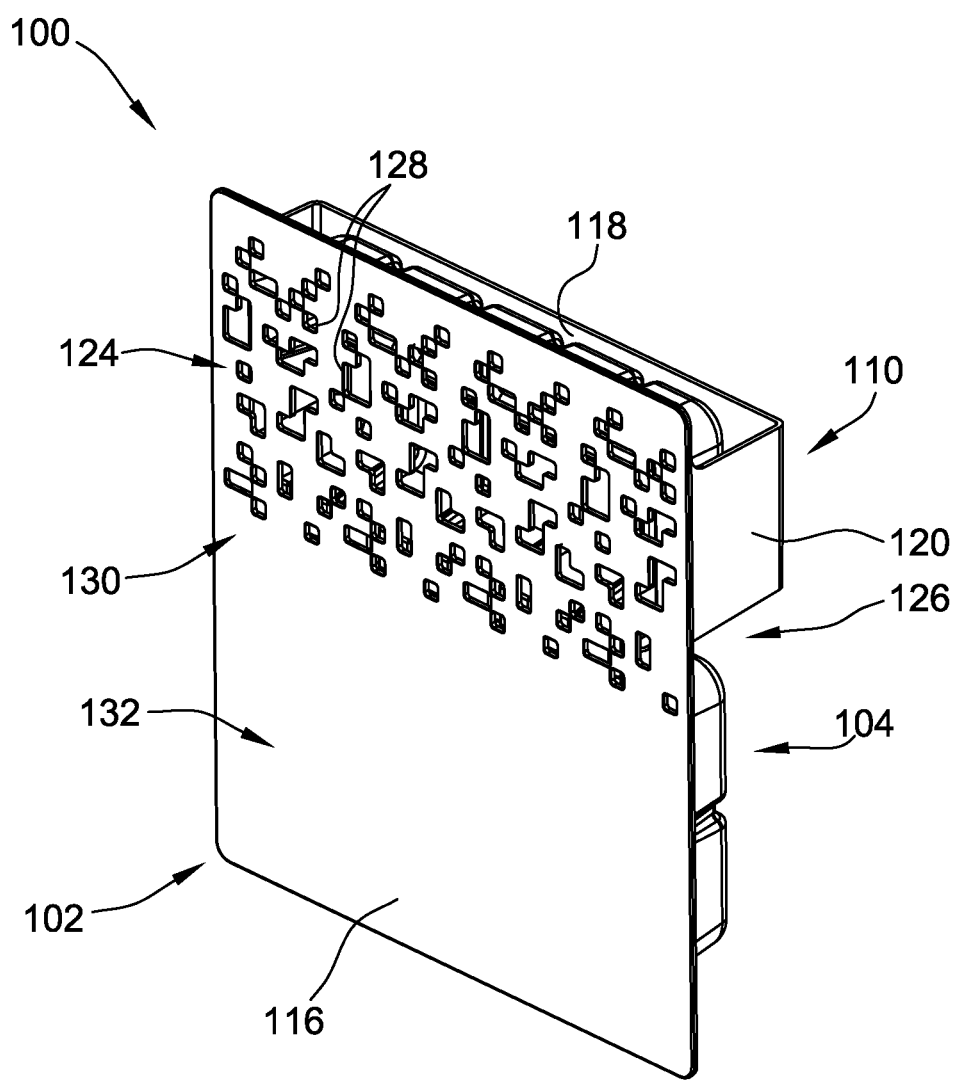
FIG. 1 is a front perspective view of an exemplary dehumidifier apparatus.
Figure 2:
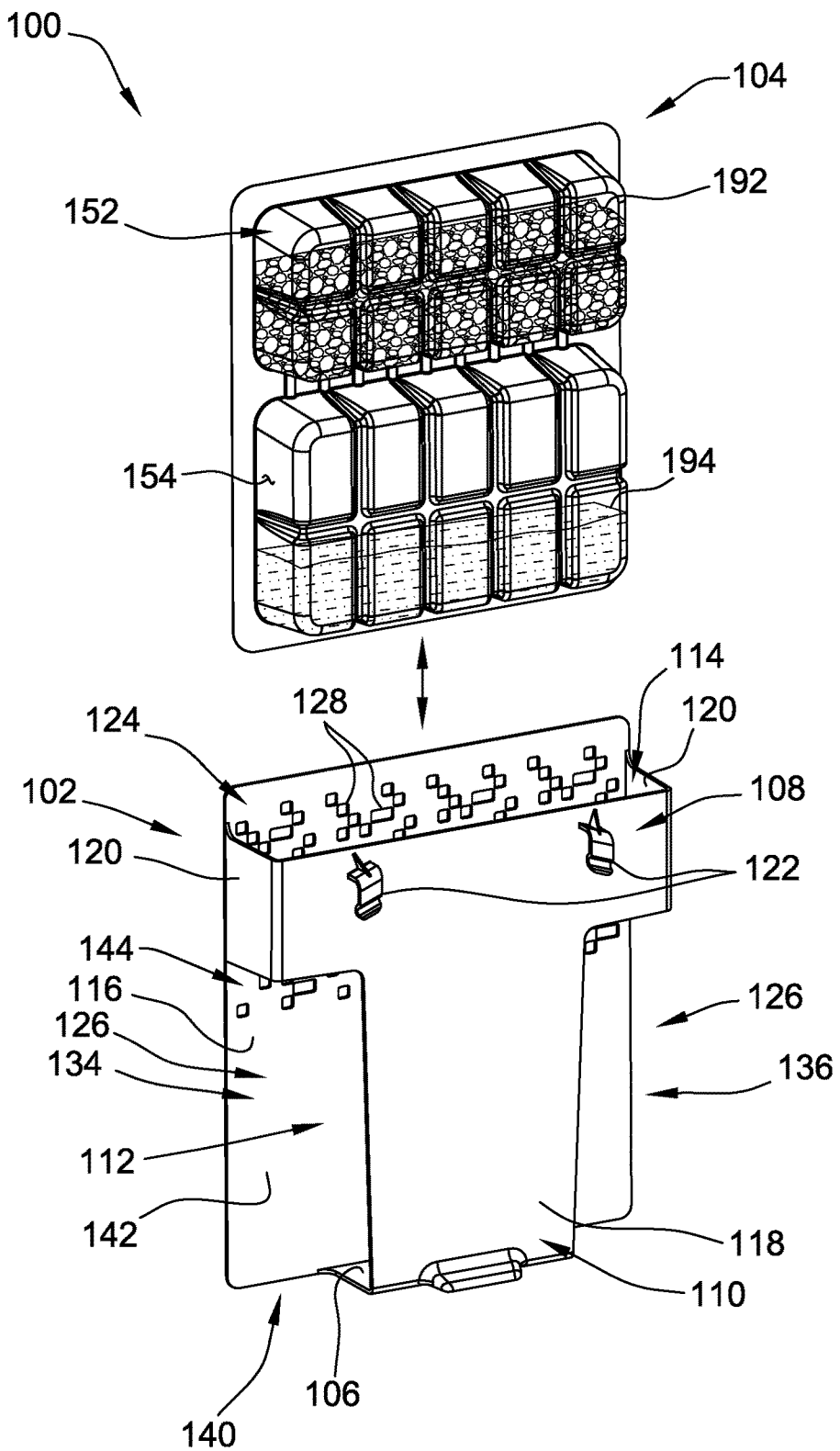
FIG. 2 is a back exploded view of the apparatus shown in FIG. 1.

FIG. 1 is a front perspective view of an exemplary dehumidifier apparatus 100, and FIG. 2 is a back exploded view of apparatus 100. In the exemplary embodiment, apparatus 100 is a nonelectric apparatus and includes a reusable (or multiple-use) housing 102 and a disposable (or single-use) cartridge 104 sized for removable insertion into housing 102. Optionally, apparatus 100 may be provided in a kit that includes housing 102 and a plurality of cartridges 104. In other embodiments, housing 102 and cartridge 104 may each be made for multi-use or single-use applications without departing from the scope of this invention (e.g., housing 102 may be made for disposal together with cartridge 104 after a single-use application, or cartridge 104 may be made to be refillable (and thus reusable) together with housing 102).

In the exemplary embodiment, housing 102 is made from a rigid plastic material and has a base 106, a hanger 108, and at least one wall 110 defining an interior space 112 and an opening 114 through which cartridge 104 is inserted into interior space 112. More specifically, housing 102 has a front wall 116, a back wall 118, and a pair of side walls 120 that collectively define interior space 112 and opening 114. Moreover, in other embodiments, housing 102 may be made from any suitable material (e.g., a metal material) and may have any suitable number of walls 110 arranged in any suitable manner such that interior space 112 and opening 114 have any suitable shape that facilitates enabling housing 102 to function as described herein. For example, in some embodiments, housing 102 may have only one wall 110 that is substantially cylindrical, such that interior space 112 is also substantially cylindrical and opening is substantially circular (with cartridge 104 likewise having a substantially cylindrical shape).

In the exemplary embodiment, base 106 is substantially flat to enable housing 102 to stand upright on a support surface (e.g., a shelf or the ground) when deployed, and hanger 108 includes a pair of hooks 122 extending outward from back wall 118 to facilitate the suspension of housing 102 from a suitable structure (e.g., a clothes hanger) when deployed. Optionally, base 106 and hanger 108 may have any suitable configurations that facilitate enabling housing 102 to function as described herein. For example, in one embodiment, base 106 may have a non-flat curvature that nonetheless enables housing 102 to stand upright on a support surface when deployed; and, in another embodiment, hanger 108 may include a pair of eyelets (not shown) defined in back wall 118 to receive separate hooks (not shown) for suspending housing 102 from a suitable structure when deployed. Alternatively, base 106 may not be configured to enable housing 102 to stand upright on a support surface when deployed, and/or housing 102 may not have hanger 108 such that housing 102 is not configured to be suspended when deployed.

In the exemplary embodiment, housing 102 has a vent 124 and at least one window 126. Vent 124 includes a plurality of apertures 128 defined in front wall 116, such that an upper region 130 (e.g., upper half) of front wall 116 has apertures 128 but a lower region 132 (e.g., lower half) of front wall 116 does not have apertures 128. Moreover, window(s) 126 include a first window 134 and a second window 136, each of which has a bottom portion 140 adjacent (and substantially coplanar with) base 106, a back portion 142 adjacent (and substantially coplanar with) back wall 118, and a side portion 144 adjacent (and substantially coplanar with) the respective side wall 120. In this manner, each window 126 enables a user to view interior space 112 from the bottom, the side, and the back of housing 102. In other embodiments, housing 102 may have any suitable number of windows 126 and vents 124 (each with any suitable number of apertures 128) arranged in any suitable manner that facilitates enabling housing 102 to function as described herein. For example, in some embodiments, vent 124 may have only one aperture 128, and/or housing 102 may have only one window 126 that permits viewing interior space 112 from only one viewpoint (e.g., the bottom, the back, or the side of housing 102).

Figure 3:
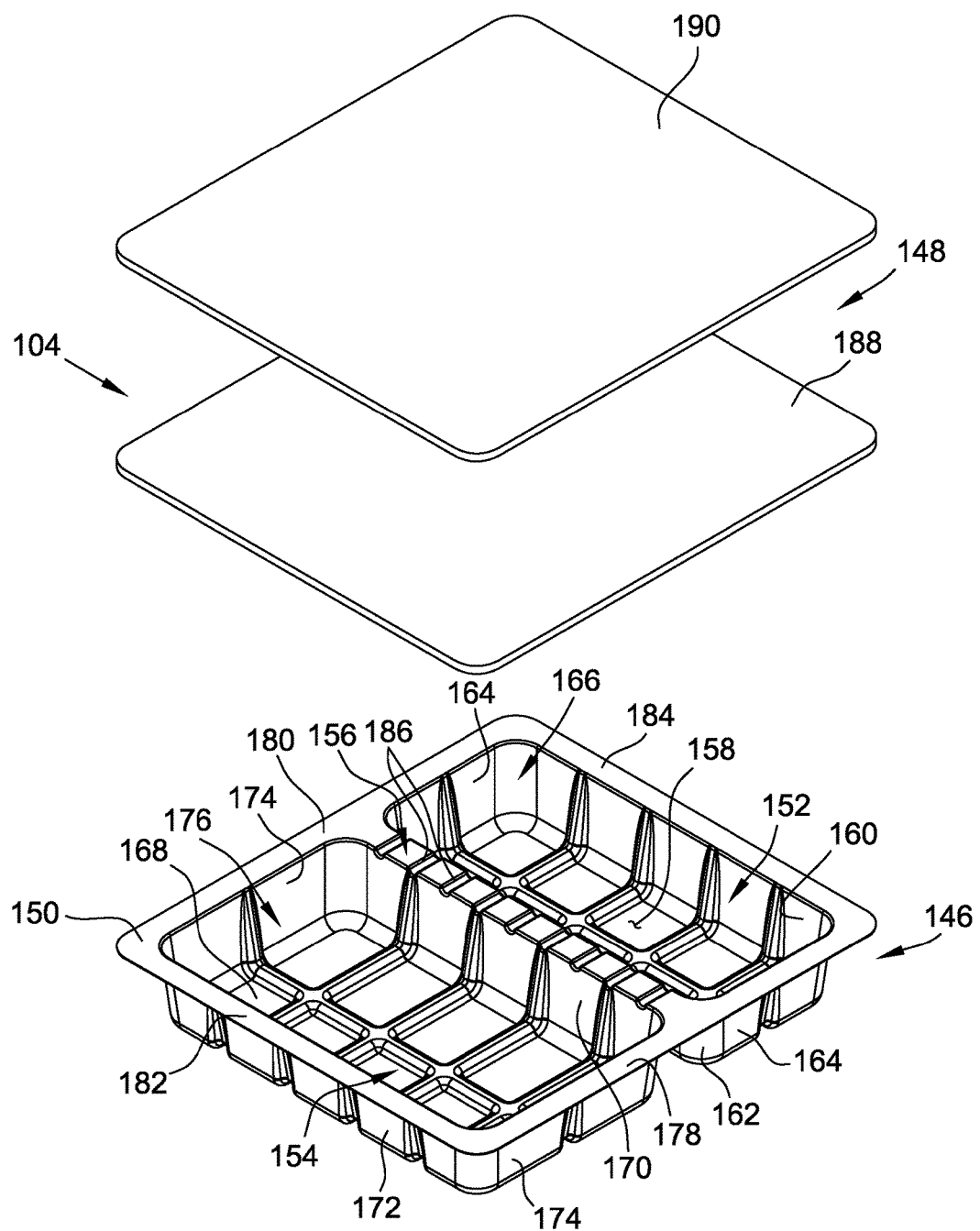
FIG. 3 is a top exploded view of a disposable cartridge of the apparatus shown in FIG. 2.

FIG. 3 is an exploded view of cartridge 104. In the exemplary embodiment, cartridge 104 is a blister-type package including a tray 146 and a cover 148 coupled (e.g., bonded) to tray 146. Tray 146 is made from a rigid plastic material (e.g., a thermoformed plastic material) that is transparent or translucent. Tray 146 has a peripheral lip 150, a first (or upper) pocket 152, a second (or lower) pocket 154, and a web 156 that are integrally formed together as a single-piece, unitary structure. More specifically, first pocket 152 has a back wall 158, in addition to a top wall 160, a bottom wall 162, and a pair of side walls 164 that collectively define a front opening 166 opposite back wall 158. Similarly, second pocket 154 has a back wall 168, in addition to a top wall 170, a bottom wall 172, and a pair of side walls 174 that collectively define a front opening 176 opposite back wall 168. Web 156 extends from a first side segment 178 of lip 150 to a second side segment 180 of lip 150, thereby positioning second pocket 154 between web 156 and a bottom segment 182 of lip 150, and positioning first pocket 152 between web 156 and a top segment 184 of lip 150. First pocket bottom wall 162 and second pocket top wall 170 are thus spaced apart from one another across web 156.

In this manner, first pocket 152 and second pocket 154 are in fluid communication with one another across a plurality of open-faced (e.g., substantially semi-cylindrical) channels 186 defined by web 156, such that channels 186 are spaced apart from one another along web 156. Optionally, in other embodiments, tray 146 may have any suitable number of pockets and channels arranged in fluid communication with one another in any suitable manner that facilitates enabling cartridge 104 to function as described herein. For example, in one embodiment, tray 146 may not have web 156 (i.e., channels 186 may not be defined by web 156), and/or tray 146 may have only one channel 186. In another embodiment, tray 146 may have a plurality of first pockets 152, and/or a plurality of second pockets 154. In a further embodiment, lip 150 may not extend about the entire periphery of tray 146, or alternatively tray 146 may not have lip 150. Other arrangements are also contemplated without departing from the scope of this invention.

In the exemplary embodiment, cover 148 has a first layer 188 and a second layer 190. First layer 188 is permeable to gas and impermeable to liquid (i.e., first layer 188 is a breathable and hydrophobic fabric, such that air can flow through first layer 188 in both directions, but liquid cannot flow through first layer 188 in either direction). Second layer 190, on the other hand, is impermeable to both gas and liquid (e.g., second layer 190 is a thin film such as, for example, a foil). First layer 188 is substantially rectangular and is coupled (e.g., bonded) directly to lip 150 such that first layer 188 is not intended to be detached from tray 146 by a user. Second layer 190, however, is coupled (e.g., bonded) to first layer 188 (and is, hence, indirectly coupled to lip 150) such that second layer 190 is intended to be detached from first layer 188 and from tray 146 by a user. First layer 188 and second layer 190 completely cover first pocket 152, second pocket 154, and channels 186, thereby preventing fluid flow into pockets 152, 154 before apparatus 100 is deployed. A desiccant material 192 (shown in FIG. 2) (e.g., a granular desiccant material) is thus sealed inside first pocket 152, and a gel-forming material 194 (shown in FIG. 2) (e.g., a gel-forming powder) is thus sealed inside second pocket 154.

In other embodiments, cover 148 may have any suitable number of layers coupled to tray 146 in any suitable manner that facilitates enabling cartridge 104 to function as described herein. Although each layer 188, 190 of cover 148 is a single-piece layer (i.e., a single sheet of material) that covers first pocket 152, second pocket 154, and channels 186 in the exemplary embodiment, each layer 188, 190 may have any suitable number of pieces in other embodiments, and the various pieces of each layer may be coupled together in any suitable manner. For example, in one embodiment, at least one layer 188, 190 may have a first piece (not shown) that covers first pocket 152 (and optionally channels 186), and a second piece (not shown) that covers second pocket 154 (and optionally channels 186), wherein the first piece is not coupled directly to the second piece. Moreover, in another embodiment, a first part of cover 148 (e.g., a part of cover 148 positioned over first pocket 152) may have a first layer (e.g., a layer that is liquid impermeable and gas permeable) and a detachable second layer (e.g., a layer that is liquid impermeable and gas impermeable), whereas a second part of cover 148 (e.g., a part of cover 148 positioned over second pocket 154 and channels 186) may have only one layer (e.g., a layer that is both liquid impermeable and gas impermeable).

Figure 4:
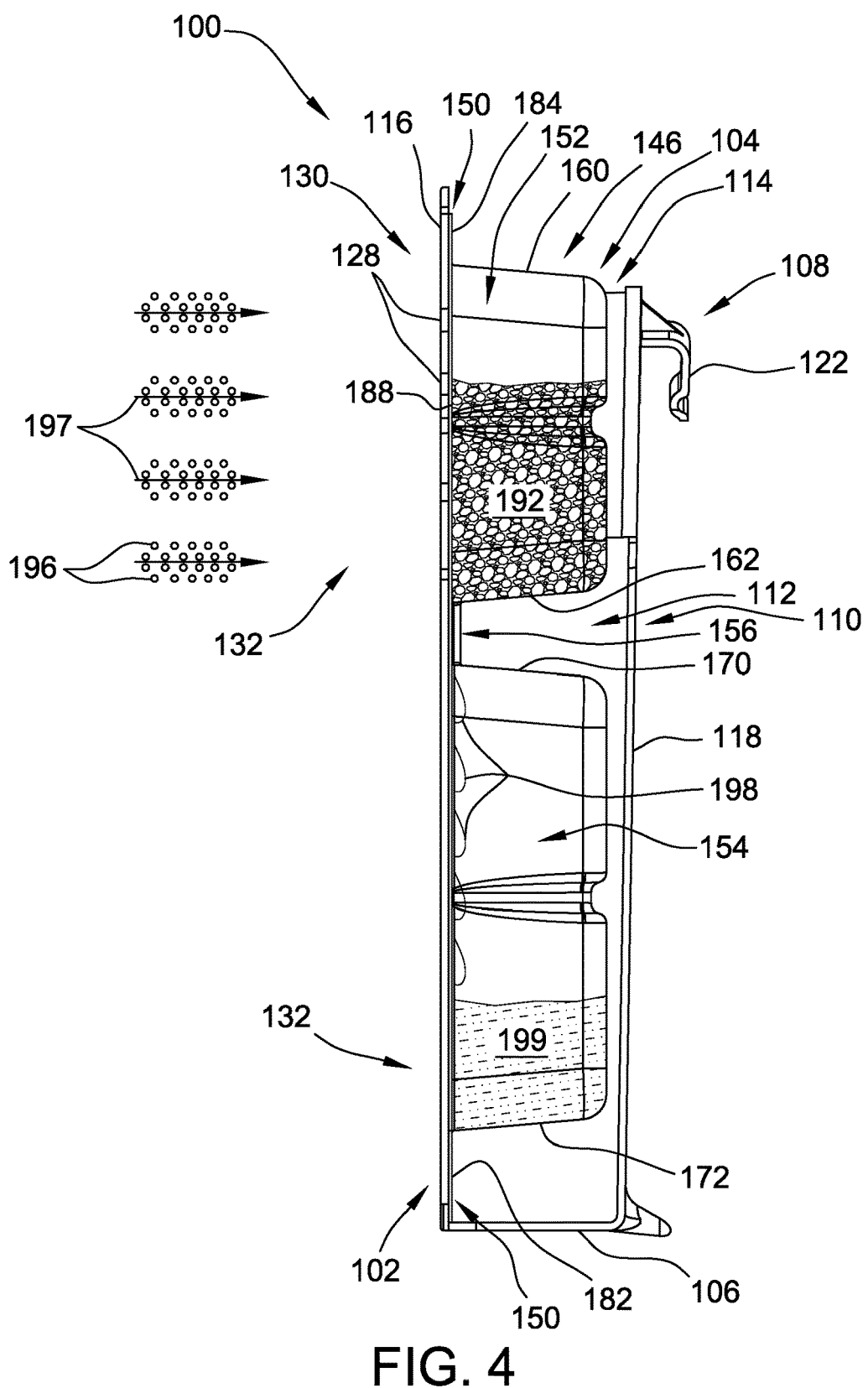
FIG. 4 is a schematic cross-sectional view of the apparatus shown in FIG. 1 when deployed.

FIG. 4 is a schematic cross-sectional view of apparatus 100 when deployed. To deploy apparatus 100, second layer 190 is detached from first layer 188 (and thus from lip 150) such that first layer 188 is exposed to the ambient, and cartridge 104 is then inserted into interior space 112 of housing 102 via opening 114 such that first layer 188 of cover 148 faces front wall 116 of housing 102 with tray 146 (e.g., bottom segment 182 of lip 150) seated on base 106. Housing 102 is then either stood upright on a suitable support surface via base 106, or hung from a suitable structure via hanger 108. In this manner, ambient air 197 is permitted to flow into and out of first pocket 152 via vent 124 of housing 102 and first layer 188 of cover 148, with desiccant material 192 absorbing vapor 196 (e.g., water vapor) from air 197. When desiccant material 192 becomes supersaturated, desiccant material 192 discharges liquid 198 (e.g., in the form of water droplets) that flows onto bottom wall 162 of first pocket 152 and into second pocket 154 via channels 186. In second pocket 154, liquid 198 interacts with gel-forming material 194 (shown in FIG. 2) to form a gel 199. Notably, in some embodiments, gel-forming material 194 includes (e.g., is mixed with) a dye to facilitate forming a colored gel (e.g., a green or blue gel) that is visible through walls 168, 170, 172, 174 of tray 146.

As desiccant material 192 continues to absorb vapor 196 and discharge liquid 198, the amount of gel 199 in second pocket 154 gradually increases until it occupies substantially all of second pocket 154. Notably, because tray 146 is visible through window(s) 126, a user is thus able to quickly determine the fullness of second pocket 154 without handling apparatus 100, in that tray 146 is transparent or translucent and gel 199 is colored. When second pocket 154 is substantially full of gel 199, the user removes cartridge 104 from housing 102 via opening 114 and then inserts a new cartridge 104 after detaching second layer 190 of the new cartridge 104. The user then disposes of the removed cartridge 104 in an appropriate manner, and periodically monitors the level of gel 199 in the new cartridge 104 until it too is in need of replacement. This process is repeatable as desired to continually dehumidify any suitable space.

Because the entire cartridge 104 (i.e., first pocket 152, desiccant material 192, second pocket 154, and gel 199) is able to be removed and discarded as a single unit, the process for refilling apparatus 100 is made quicker and easier. Moreover, because first layer 188 is impermeable to liquid 198, all liquid 198 contained inside first pocket 152 and/or second pocket 154 is prevented from spilling in the event that apparatus 100 (or cartridge 104) is tipped over, dropped, or otherwise mishandled during transport or deployment. Similarly, because liquid 198 is converted to gel 199 in second pocket 154, spillage of liquid 198 from apparatus 100 is further minimized. Notably, some embodiments of apparatus 100 may not convert liquid 198 to gel 199 in second pocket 154 (i.e., may not have gel-forming material 194) but, rather, may trap liquid 198 in second pocket 154 until cartridge 104 is discarded.

The methods and systems described herein therefore facilitate providing a dehumidifier apparatus that is easily deployed, monitored, and refilled/emptied. More specifically, the methods and systems described herein facilitate providing a dehumidifier apparatus that is easily deployed by removing part of a cover from a cartridge, inserting the cartridge into a housing, and positioning the housing in a location for which dehumidification is desired. The method and systems described herein also facilitate providing an apparatus that is easily monitored to determine whether the cartridge is in need of replacement, in that the cartridge uses the liquid removed from the air to create a colored gel that is visible to the user through a tray of the cartridge and a window of the housing. Moreover, the methods and systems described herein further facilitate providing an apparatus that is easily refilled/emptied by pulling the cartridge out of the housing for disposal, and inserting a new cartridge into the housing.

Exemplary embodiments of an apparatus are described above in detail. The apparatus described herein is not limited to the specific embodiments described herein, but rather, components of the apparatus may be utilized independently and separately from one another. For example, the apparatus described herein may have other applications not limited to practicing dehumidification, as described herein. Rather, the apparatus described herein can be implemented and utilized in connection with various other industries.

This written description uses example embodiments, while disclosing the best mode and enabling any person skilled in the art to practice the example embodiments, including making and using any devices or systems and performing any incorporated methods. The patentable scope of this disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A dehumidifier apparatus comprising:
   a housing comprising an interior space and a vent for permitting airflow into said interior space; and
   a cartridge sized for removable insertion into said interior space of said housing, wherein said cartridge comprises:
      a tray defining a first pocket and a second pocket;
      a cover coupled to said tray, wherein said first pocket is coupled in fluid communication with said second pocket such that liquid may flow from said first pocket into said second pocket, wherein said cover comprises at least a first layer, said first layer being gas permeable and liquid impermeable; and
      a desiccant material contained in said first pocket by said cover.

2. A dehumidifier apparatus in accordance with claim 1, wherein said tray is made from a thermoformed plastic material.

3. A dehumidifier apparatus in accordance with claim 1, wherein said first layer is a foil.

4. A dehumidifier apparatus in accordance with claim 1, further comprising a gel-forming material contained in said second pocket.

5. A dehumidifier apparatus in accordance with claim 4, wherein said gel-forming material comprises a dye.

6. A dehumidifier apparatus in accordance with claim 5, wherein said tray is one of transparent and translucent.

7. A dehumidifier apparatus in accordance with claim 6, wherein said housing comprises a window through which said second pocket of said tray is visible.

8. A disposable cartridge for a dehumidifier apparatus, said cartridge comprising:
   a tray defining a first pocket and a second pocket;
   a cover coupled to said tray, wherein said first pocket is coupled in fluid communication with said second pocket such that liquid may flow from said first pocket into said second pocket, wherein said cover comprises at least a first layer, said first layer being gas permeable and liquid impermeable; and a desiccant material contained in said first pocket by said cover.

9. A disposable cartridge in accordance with claim 8, wherein said tray is made from a thermoformed plastic material.

10. A disposable cartridge in accordance with claim 8, wherein said first layer is a foil.

11. A disposable cartridge in accordance with claim 8, further comprising a gel-forming material contained in said second pocket.

12. A disposable cartridge in accordance with claim 11, wherein said gel-forming material comprises a dye.

13. A disposable cartridge in accordance with claim 12, wherein said tray is one of transparent and translucent.

14. A disposable cartridge in accordance with claim 8, wherein said tray comprises a plurality of spaced-apart channels.

15. A method of making a disposable cartridge for a dehumidifier apparatus, said method comprising:

providing a tray defining a first pocket and a second pocket;

inserting a desiccant material in the first pocket of the tray; and coupling a cover to the tray, wherein the first pocket is coupled in fluid communication with the second pocket such that liquid may flow from said first pocket into said second pocket and such that the desiccant material is contained in the first pocket, wherein the cover has at least a first layer, the first layer being gas permeable and liquid impermeable.

16. A method in accordance with claim 15, wherein providing a tray comprises forming the tray.

17. A method in accordance with claim 16, wherein forming the tray comprises thermoforming the tray.

18. A method in accordance with claim 16, wherein forming the tray comprises forming the tray to be one of transparent and translucent.

19. A method in accordance with claim 15, further comprising inserting a gel-forming material in the second pocket.

20. A method in accordance with claim 19, further comprising mixing a dye with the gel-forming material.

\* \* \* \* \*